US012458990B2

(12) United States Patent
Moretti

(10) Patent No.: US 12,458,990 B2
(45) Date of Patent: Nov. 4, 2025

(54) FLUID SUBSTANCE DISPENSING DEVICE

(71) Applicant: Lumson S.p.A., Capergnanica (IT)

(72) Inventor: Matteo Moretti, Crema (IT)

(73) Assignee: LUMSON S.P.A., Capergnanica (IT)

( * ) Notice: Subject to any disclaimer, the term of this patent is extended or adjusted under 35 U.S.C. 154(b) by 266 days.

(21) Appl. No.: 18/128,684

(22) Filed: Mar. 30, 2023

(65) Prior Publication Data

US 2023/0321678 A1 Oct. 12, 2023

(30) Foreign Application Priority Data

Apr. 6, 2022 (IT) ........................ 102022000006758

(51) Int. Cl.

*B05B 11/00* (2023.01)
*B05B 11/02* (2023.01)
*B05B 11/10* (2023.01)

(52) U.S. Cl.

CPC ........ *B05B 11/107* (2023.01); *B05B 11/0038* (2018.08); *B05B 11/0054* (2013.01); *B05B 11/026* (2023.01); *B05B 11/1047* (2023.01); *B05B 11/1094* (2023.01)

(58) Field of Classification Search

CPC . B05B 11/107; B05B 11/1047; B05B 11/026; B05B 11/1094; B05B 11/0054; B05B 11/0038

USPC .......................................... 222/401, 325, 96

See application file for complete search history.

(56) References Cited

U.S. PATENT DOCUMENTS

| | | | | |
|---|---|---|---|---|
| 4,770,323 A | | 9/1988 | DeBard | |
| 5,680,970 A | * | 10/1997 | Smith | B65D 47/248 222/509 |
| 5,769,274 A | | 6/1998 | Behar | |
| 9,862,588 B2 | * | 1/2018 | Johnson | B67D 1/0835 |
| 2014/0312072 A1 | * | 10/2014 | Knight | B05B 11/0005 222/384 |
| 2016/0264319 A1 | | 9/2016 | Johnson | |

FOREIGN PATENT DOCUMENTS

| | | | | |
|---|---|---|---|---|
| DE | 102019120624 A1 | * | 2/2021 | |
| EP | 0182094 B1 | | 8/1990 | |
| WO | 2021013492 A1 | | 1/2021 | |

* cited by examiner

*Primary Examiner* — Paul R Durand
*Assistant Examiner* — Michael C Patterson
(74) *Attorney, Agent, or Firm* — Dickinson Wright PLLC; Andrew D. Dorisio

(57) ABSTRACT

A fluid substance dispensing device includes an external container with a containment element formed of a deformable part and an essentially rigid neck featuring a first flange which abuts with a free end of the external container at one of the mouth thereof, an intermediate element with a cup-shaped part inserted into the neck and fastened to the external container so that the first flange is sandwiched between the free end and the intermediate element, the cup-shaped part including an opening in communication with an internal part of the deformable part, there being—inside the cup-shaped part—a valve element configured for displacement by the body of an airless pump so that, when the body of the pump is absent or in an unused position, the valve element is stably closed, while when the pump body is pushed into a use position, the valve element is stably open.

10 Claims, 3 Drawing Sheets

FLUID SUBSTANCE DISPENSING DEVICE

This application claims priority to Italian Patent Application for Invention No. 102022000006758 filed on Apr. 6, 2022, the disclosure of which is hereby incorporated by reference.

FIELD OF THE INVENTION

The present invention relates to a fluid substance dispensing device.

In particular, it refers to a device for dispensing by means of a hermetic (also known as "airless") pump.

BACKGROUND ART

There are commonly known devices for dispensing a fluid substance by means of an airless system which have an external container in which a deformable bag is housed.

The deformable bag is filled and the device is closed by applying the pump thereto.

Therefore, the operation of fastening the pump to the container must take place at the same time or immediately after the filling thereof since the said pump acts as a closure for the system.

WO2021/013492 A1, U.S. Pat. No. 5,769,274 A and US2016/264319 disclose dispensing devices known in the art.

SUMMARY OF THE INVENTION

The object of the present invention is to provide a device which is improved compared with the prior art.

A further object of the invention is to provide a device which allows the filling step and the step of coupling the pump at different times, even considerably temporally distant.

This and other objects are achieved by means of a fluid substance dispensing device according to the technical teachings of the appended claims.

BRIEF DESCRIPTION OF THE FIGURES

Further features and advantages of the innovation will become clearer in the description of a preferred but not exclusive embodiment of the device, illustrated—by way of a non-limiting example—in the drawings annexed hereto, in which.

DETAILED DESCRIPTION OF THE INVENTION

Figure 1:
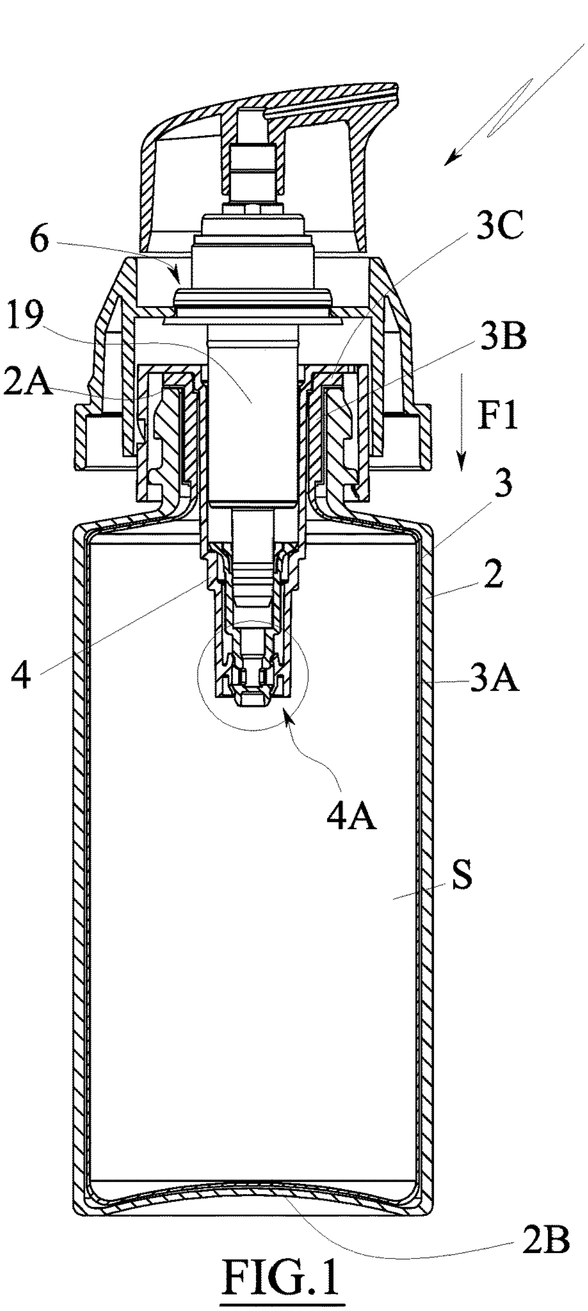
FIG. 1 is an axial sectional view of the device according to the invention, in an assembly position, i.e. with the system closed.

With reference to the figures stated, reference number 1 is used to denote, as a whole, a fluid substance dispensing device.

In the present document, the term 'fluid substance' means, for example, a viscous or liquid substance such as a cream, a make-up remover, a liquid and suchlike, in the cosmetic or medical field, which is, in any case, capable of being dispensed by means of a manually operated pump 6 of a hermetic (or airless) kind.

The fluid substance dispensing device 1 comprises an external container 2 inside which a containment element 3 is envisaged, the latter being formed of a deformable part 3A and an essentially rigid neck 3B.

The neck 3B has a first flange 3C which abuts with a free end 2A of the external container at the mouth of the external container 2.

The external container 2 may be made of one or more of the following materials: PET, PET PCR, PETG, PP, PE, HDPE.

The containment element 3 may be made of one or more of the following materials: PET, PET PCR, PP, PE, HDPE, PA, or mixes of PP+EVOH, PE EVOH.

Advantageously, the external container 2 and the containment element 3 are made by simultaneously blowing a first and a second preform (pre-heated if necessary) arranged one inside the other prior to blowing.

The device 1 further comprises an intermediate element 4 (equipped with a cup-shaped part 4B) inserted into the neck 3B and fastened to the external container 2 so that the first flange 3C is sandwiched between the free end 2A of the external container (which defines the mouth of the outer container and the intermediate element 4).

The cup-shaped part has, on the bottom thereof, an opening 4A in communication with an internal part of the deformable part 3A.

Figure 2:
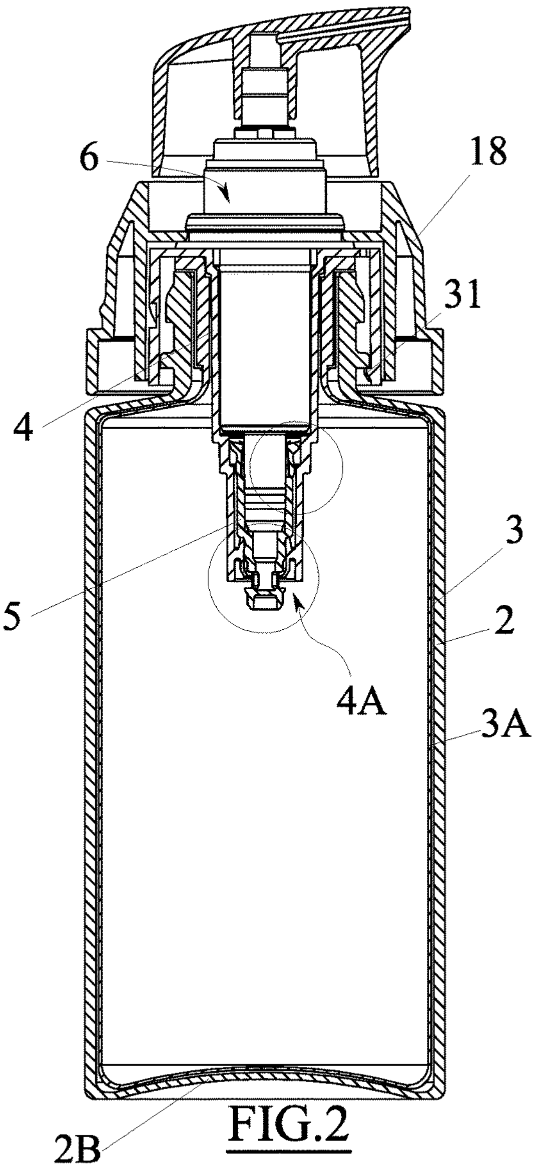
FIG. 2 is a sectional view of the device in FIG. 1 in an operating position, i.e. with the system open.

Inside the cup-shaped part 4B of the intermediate element 4, there is a valve element 5 configured so as to be moved by the body 6 of an airless pump (which is part of the device 1) so that, when the body of the pump 6 is absent or in a non-use position, the valve element 5 is in a first position (FIG. 1) which stably closes the opening 4A, while when the body of the pump 6 is pushed into a use position (i.e. with the container 1 completely assembled, as seen in FIG. 2), the valve element 5 is pushed by the pump 6, into a second position wherein the said opening 4A is stably open.

For example, on the intermediate element 4, near the opening 4A, there is a first sealing lip 7 envisaged, which cooperates with the valve element to close the opening 4A when the said element is in the said first position (i.e. the one in which the valve element 5 closes the access to the deformable part).

Optionally, the intermediate element 4 also has a second sealing lip 8 which forms a seal against an external cylindrical wall of the valve element 5 when the said intermediate element is in the second position (i.e. the open position).

To make the sealing lips functional, the valve element 5 may have an elongated shape with a bottom wall 10 which is closed and facing a bottom 2B of the external container 2 and a cavity 11 for the inflow of the said fluid substance towards the pump 6.

The valve element 5 may therefore envisage at least one passage 9 (but preferably more than one) made in one of the side walls thereof, in communication with the said cavity 11.

Figure 3:
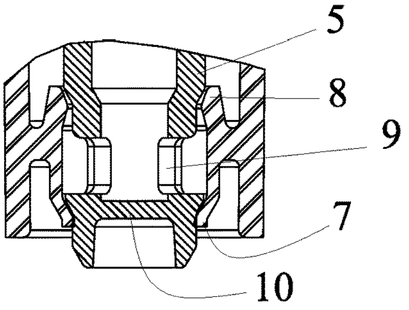
FIG. 3 is an enlargement of the part circled in FIG. 1.

As can be seen from the detail in FIG. 3, when the valve element 5 is in the said first (closed) position, the first sealing lip 7 is interposed between the bottom 2B of the external container and the said passage 9 in the valve element 5, thereby isolating the contents of the deformable part 3A from the said passage 9 and from the cavity 11.

In this closed condition, the passage 9 is interposed between the first 7 and the second 8 lip. However, it must be said that in this condition, the second lip 8 cannot form any seal against the valve element 5, given that the seal provided by the first lip 7 is sufficient to close the container.

However, given that the strokes involved may differ for the various applications, it is possible that the second lip 8 (in the closed position) also contributes to the seal, even though the primary seal is provided by the first lip 7.

According to the invention, the valve element 5 has an elastic system 12 which keeps it in the said first position elastically.

Figure 9:
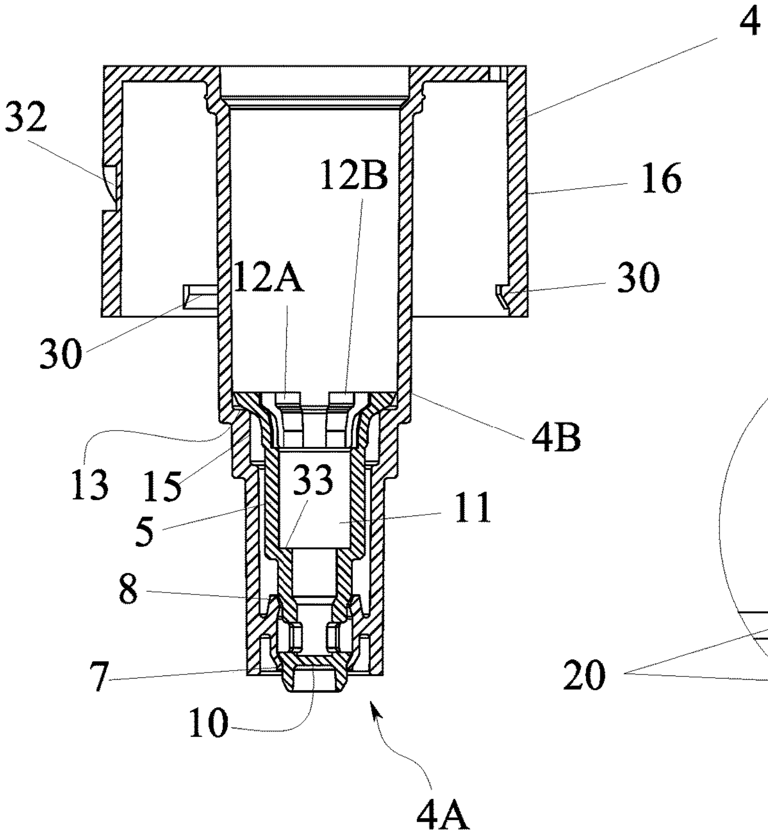
FIG. 9 is an axial section of the intermediate element and of the valve element when they are in the position in FIG. 1.

The said elastic system 12 comprises a plurality of fins 12A, 12B, . . . which, in the said first position (closed, FIG. 9) abut with a first step 13 on the cup-shaped part 4B.

Indeed, when cooperating with the first step 13, the elastic system 12, acts as a mechanical stop for the valve element 5 during a step (preferably carried out by means of an automatic assembly machine) in which the valve element 5 is coupled to the intermediate element 4.

Figure 10:
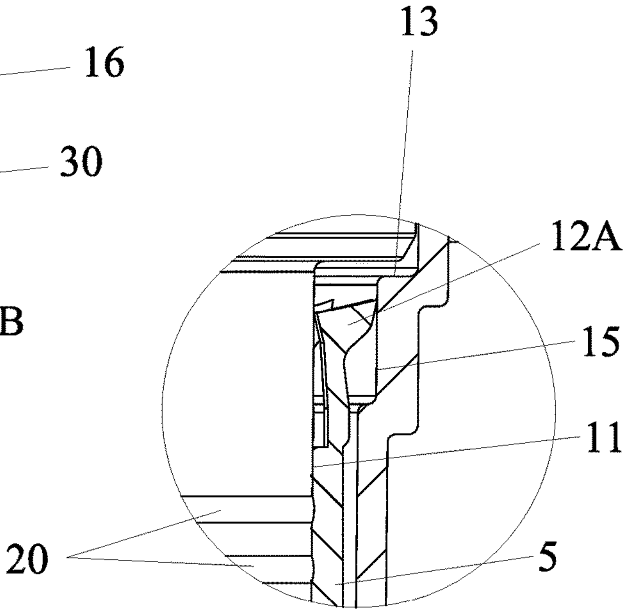
FIG. 10 is an enlarged view of the part circled at the top in FIG. 2.
Figure 11:
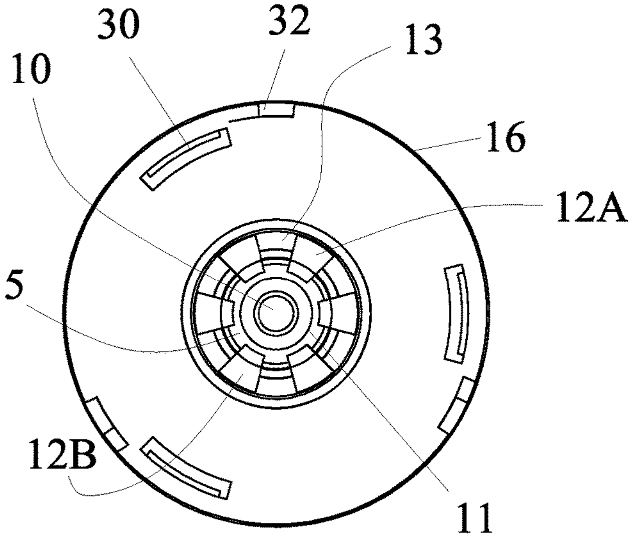
FIG. 11 is a top-down view of the intermediate element and the valve element in FIGS. 7 and 8.

When the valve element 5 is displaced—through the insertion of the pump 6 (arrow F1), therefore by contact with the pump—into the second position, the fins 12A, 12B, . . . bend (FIG. 10) and fit into a reduced diameter portion 15 (underneath the step 13) of the intermediate element 4.

Figure 4:
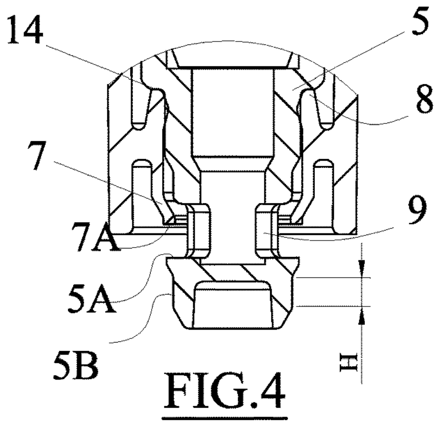
FIG. 4 is an enlargement of the part circled at the bottom of FIG. 2.

It can also be seen in FIG. 4 that, when the valve element 5 is in the second (open) position, a second step 14 of the valve element 5 abuts with the second lip 8, which prevents the latter moving further towards the bottom 2B of the container 2.

In the second position, the second lip 8 can form a seal against the valve element 5, in an area above the passage 9, thereby preventing any leakage of the substance S from between the cup-shaped part 4A and the valve element.

It should be noted that, in this configuration, a protruding part 19A of the pump 6 unit can be inserted hermetically into the cavity 11 of the valve element. To improve the seal, the body 19 of the pump 6 can be equipped with sealing means 20 (for example annular swellings) interacting with an internal surface (the cavity 11) of the valve element 5.

The cavity 11 of the valve element 5 can feature a third step 33, with which a free end of the protruding part 19A of the pump 6 unit abuts, whose task is precisely to move the valve element 5.

Figure 5:
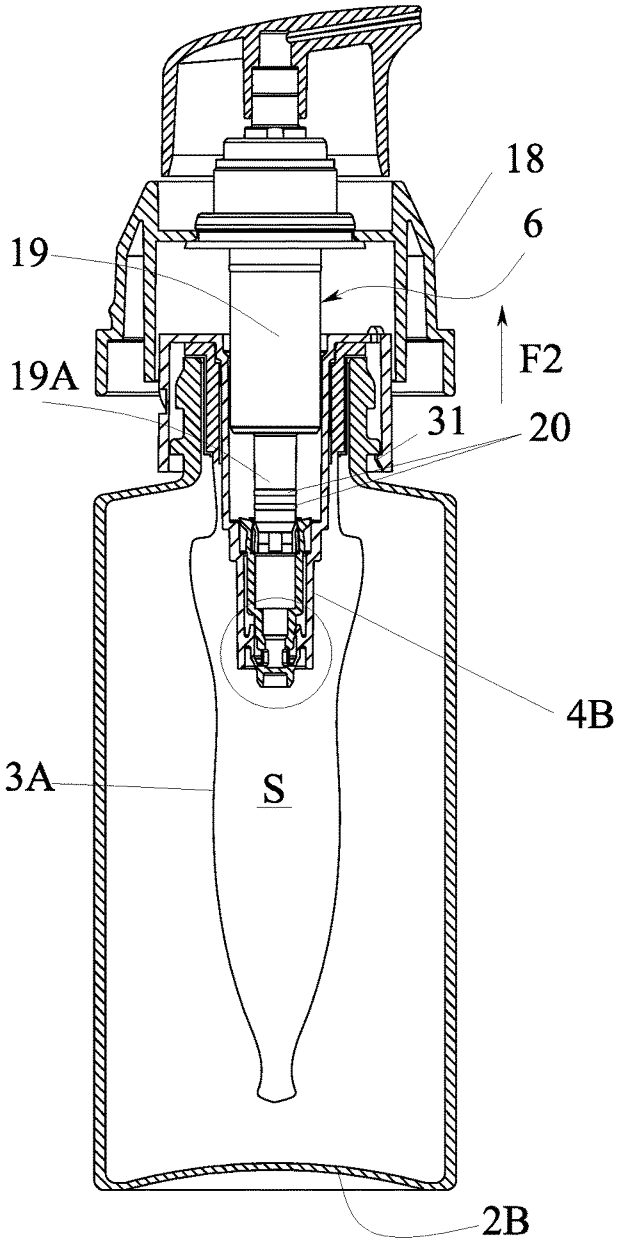
FIG. 5 is an axial sectional view of the device in FIG. 1 in a dismantled position.
Figure 7:
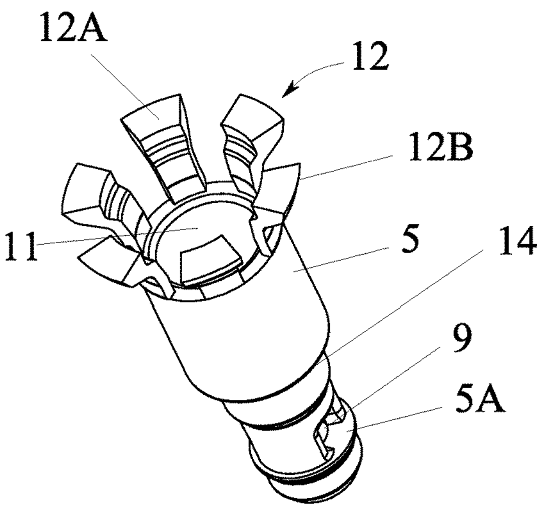
FIG. 7 is a perspective view of a valve element of the device in FIG. 1.
Figure 8:
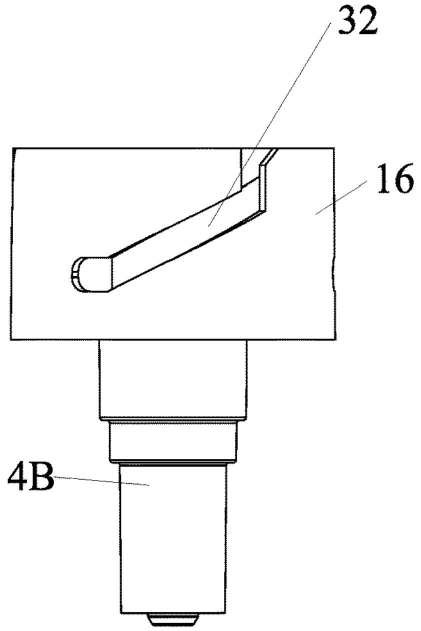
FIG. 8 is a side view of an intermediary element of the device in FIG. 1.

When the content of the containment element 3 (therefore the fluid substance S) has been completely or almost completely dispensed by the pump 6 (as can be seen in FIG. 5 where the deformable part 3A is flattened), it is possible to separate the pump 6 unit from the intermediate element 4 (or in any case from the external container 2).

Figure 6:
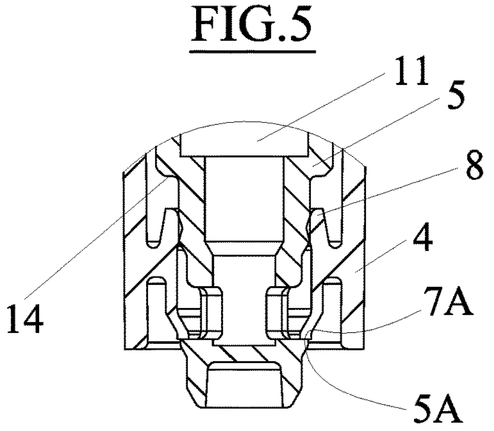
FIG. 6 is an enlargement of the part circled in FIG. 5.

When the pump body 6 is disassembled (therefore pulled upwards in FIG. 5, arrow F2), the said body drags the valve element 5 with it, lifting the said valve element (by virtue of the hermetic coupling between the pump and cavity 11), until a stop 7A (made on the first lip 7 (see FIG. 6) prevents the extraction of the valve element 5 from the intermediate element 4 by contact with the stop surface 5A of the valve element 5.

To end the present description, it must be underlined that the intermediate element 4 can have a skirt 16 for fastening, preferably by an undercut or a snap-fitting, with the external container 2, for example by means of teeth 30 which snap-fit onto a flange-shaped protrusion 31, which is part of the external container 2.

This simplifies and speeds up the fitting of the intermediate element 4 onto the container immediately after the containing element 3 is filled with the substance S.

One particularly advantageous option is to prepare the intermediate element 4 with the valve element 5 already pre-assembled in the closed position. In this case, therefore, the assembly comprising the intermediate element 4 and the valve element 5 that acts as a 'snap-fit' cap for the filled container 3.

When the assembly comprising the intermediate element 4 and valve element 5 is fitted onto a just-filled container, it is possible that a slight internal overpressure may be created, which displaces the valve element 5 slightly upwards (FIG. 3).

In any case, the height H (see FIG. 4) of the protruding portion 5B against which the first lip 7 forms a seal, can be optimised so as to guarantee a sealed contact with the first lip 7, even in the event of this upward displacement of the element 5 (therefore the said protruding portion may be longer or shorter, depending on needs).

To complete the description, it should be noted that the pump 6 unit can be fastened to a ring nut 18 equipped with screw or cam coupling means 32 for coupling to the skirt 16.

This system considerably simplifies and speeds up coupling the pump unit to the sealed, pre-filled container using the valve element 5 fitted into the intermediate element 4 in the first (closed) position.

The same system also considerably speeds up decoupling of the pump 6 unit from the external container 2 (once the product is finished).

It is therefore possible to easily dispose of the pump and the container separately (for recycling purposes) or it is possible to use the pump 6 unit again with a new pre-filled external container which is kept sealed precisely by the intermediate element 4 and by the valve body 5 until the pump 6 unit is re-inserted.

From the description above, it can be seen that, when the valve element is in the first position (FIG. 1), the contents of the deformable part 3A (or of the internal element) are perfectly isolated from the external environment even if the pump 6 (or rather the pump unit) is not assembled on the intermediate element 4 or on the external container 2.

It is therefore also possible to couple the pump unit to the pre-filled external container during a subsequent production step or advantageously to use a new pre-filled external container with the same pump for re-use purposes.

Various embodiments of the innovation have been disclosed herein, but further embodiments may also be conceived using the same innovative concept.

The invention claimed is:

1. A device for dispensing a fluid substance, comprising:

an external container (2) inside which a containment element (3) is provided, formed by a deformable part (3A) and by a rigid neck (3B), the neck (3B) having a first flange (3C) abutting a free end (2A) of the external container at a mouth of the external container, an intermediate element (4) having a cup-shaped part (4B) inserted in the neck (3B) and fixed to the external container (2) so that the first flange (3C) is sandwiched between said free end (2A) and the intermediate element (4), the cup-shaped part providing an opening (4A) in communication with an internal part of the deformable part (3A), inside the cup-shaped part (4B) there is a valve element (5) configured to be moved by a pump body (19) of an airless pump (6) so that, when the pump body is absent or in a non-used position, the valve element (5) is in a first position of stable closing of the opening (4A), while when the pump body (19) is pushed into a position of use, the valve element (5) is in a second position of stable opening of said opening (4A), the valve element (5) providing an elastic system (12) which keeps the valve element (5) elastically in said first position, characterized in that the elastic system (12) comprises a plurality of fins (12A, 12B) which, in said first position, meet a first step (13) of the cup-shaped part (4B), and the plurality of fins, in said second position, fit into a reduced diameter portion (15) of the intermediate element (4).

2. The device according to claim 1, in which, near the opening (4A), a first sealing lip (7) is provided which cooperates with the valve element to close the opening (4A) when the valve element (5) is in said first position, and a second sealing lip (8) is provided which provides a seal on an external cylindrical wall of the valve element (5) when the valve element (5) is in said second position.

3. The device according to claim 1, in which the valve element (5) has:

an elongated conformation, with a bottom wall (10) closed and facing a bottom (2B) of the external container (2);

a cavity (11) for an outflow of a fluid substance; and at least one passage (9) provided on a side wall of the valve element (5), the at least one passage (9) being in communication with said cavity (11).

4. The device according to claim 2, wherein when the valve element (5) is in said first position, the first sealing lip is interposed between a bottom (2B) of the external container (2) and at least one passage (9) of the valve element (5), and said at least one passage (9) is interposed between the first sealing lip (7) and the second sealing lip (8).

5. The device according to claim 2, in which the first sealing lip (7) is provided with a stop (7A) which prevents an extraction of the valve element (5) from the intermediate element (4), by contact with a stop surface (5A).

6. The device according to claim 2, in which, in said second position, a second step (14) of the valve element (5) meets said second lip (8), to prevent a further movement of the valve element (5) towards the bottom of the external container (2).

7. The device according to claim 1, in which the intermediate element (4) has a skirt (16) for fastening, by an undercut or by a snapfitting, to the external container (2).

8. The device according to claim 7, in which the pump body (19) is fixed to a ring nut (18) equipped with screws or a cam for coupling the ring nut to the skirt (16).

9. The device according to claim 8, in which the pump body (19) is equipped with sealing rings (20) to create a seal between the pump body and an internal surface of the valve element (5).

10. The device according to claim 1, in which the external container (2) and the containment element (3) are made by simultaneous blow molding of a first preform and a second preform, and the containment element is inserted into the external container prior to blow molding.

* * * * *